(12) United States Patent
Matsuo

(10) Patent No.: US 8,218,455 B2
(45) Date of Patent: Jul. 10, 2012

(54) INFORMATION COMMUNICATION SYSTEM, INFORMATION COMMUNICATION METHOD, NODE DEVICE INCLUDED IN INFORMATION COMMUNICATION SYSTEM AND RECORDING MEDIUM RECORDING INFORMATION PROCESS PROGRAM

(75) Inventor: Hideki Matsuo, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 986 days.

(21) Appl. No.: 12/230,402

(22) Filed: Aug. 28, 2008

(65) Prior Publication Data

US 2009/0003244 A1    Jan. 1, 2009

Related U.S. Application Data

(63) Continuation-in-part of application No. PCT/JP2007/055516, filed on Mar. 19, 2007.

(30) Foreign Application Priority Data

Apr. 13, 2006  (JP) .................................. 2006-110626

(51) Int. Cl.
  *H04L 12/28* (2006.01)
  *G06F 15/16* (2006.01)
  *G06F 7/00* (2006.01)
  *G06F 17/30* (2006.01)
(52) U.S. Cl. .......................... 370/255; 709/203; 707/770
(58) Field of Classification Search ........................ None
  See application file for complete search history.

(56) References Cited

U.S. PATENT DOCUMENTS

| | | | | |
|---|---|---|---|---|
| 2004/0210624 | A1* | 10/2004 | Andrzejak et al. | 709/201 |
| 2004/0249970 | A1* | 12/2004 | Castro et al. | 709/238 |
| 2005/0187946 | A1* | 8/2005 | Zhang et al. | 707/100 |
| 2005/0243740 | A1* | 11/2005 | Chen et al. | 370/256 |
| 2006/0209717 | A1* | 9/2006 | Sharma et al. | 370/254 |

(Continued)

FOREIGN PATENT DOCUMENTS

JP    A-2006-59133    3/2006

OTHER PUBLICATIONS

Oka et al., "Lightweight Load Balancing for Distributed Hash Tables", Technical report of the Institute of Electronics, Information and Communication Engineers, vol. 103, No. 650, pp. 7-12, 2004, Feb. 2004.

(Continued)

*Primary Examiner* — Andrew Chriss
(74) *Attorney, Agent, or Firm* — Oliff & Berridge, PLC

(57) ABSTRACT

A group of nodes mutually connected through a communication route form an information communication system. The nodes include a memory for memorizing node information indicating a candidate node of information transfer destination, a participation request information transfer unit for judging whether node information indicating a node of a transfer destination in response to information of the participation request node is memorized, when participation request information is received, and for transferring the participation request information to the node when the node information is memorized, an existence confirmation information sending unit for judging whether information of other than the transfer destination is memorized when the participation request information is received, and for sending existence confirmation information to the node when the information other than the transfer destination is memorized, and a unit for sending return information to the participation request node device when the existence confirmation information is received.

10 Claims, 9 Drawing Sheets

U.S. PATENT DOCUMENTS

2008/0130516 A1* 6/2008 You et al. .................. 370/254

OTHER PUBLICATIONS

Rowstron et al., "Pastry: Scalable, Decentralized Object Location, and Routing for Large-Scale Peer-to-Peer Systems", Lecture Notes in Computer Science, Proceedings of the IFIP/ACM International Conference on Distributed Systems Platforms Heidelberg, pp. 329-350, 2001, Nov. 2001.

Iwata et al., "P2P Gijutsu no Kiso Chishiki [I]", Unix Magazine, Ascii Corp., vol. 20, No. 9, pp. 82-107, 2005, Sep. 2005.

Abe, "DHT: Bunsan Hash Table", Computer Software, Japan Society for Software Science and Technology, vol. 23, No. 1, pp. 1-14, 2006, Feb. 2006.

* cited by examiner

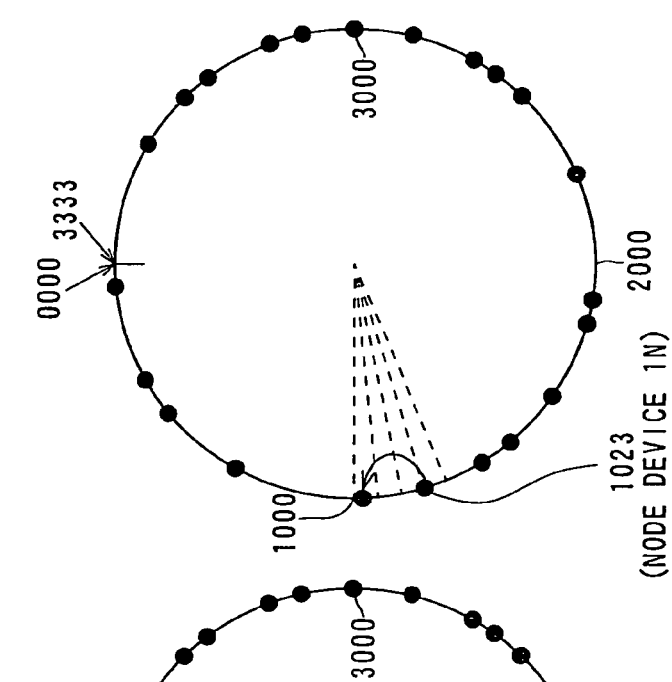
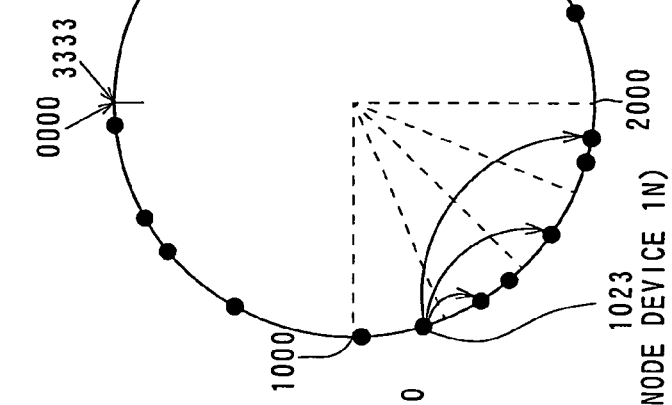
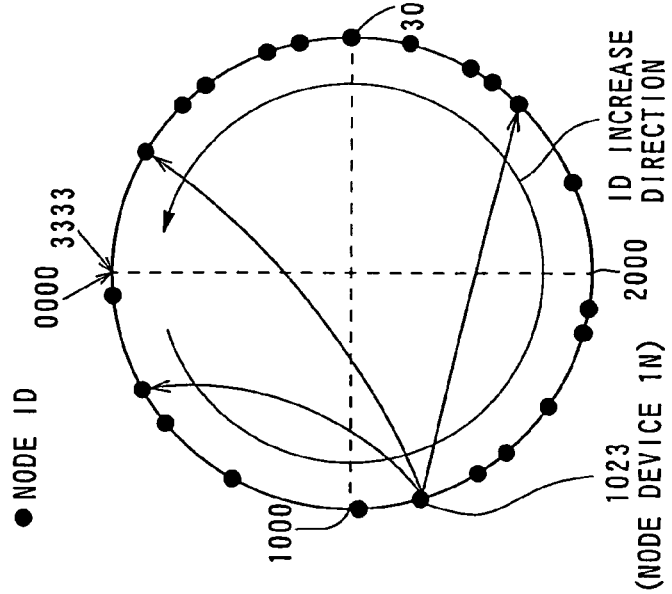

FIG. 3A

| 0130 | 1023 | 2203 | 3220 |
|---|---|---|---|
| IP ADDRESS 0 | – | IP ADDRESS 2 | IP ADDRESS 3 |

FIG. 3B

| 1023 | 1132 | 1202 | 1321 |
|---|---|---|---|
| – | IP ADDRESS 4 | IP ADDRESS 5 | IP ADDRESS 6 |

FIG. 3C

| 1000 | 1023 | – | – |
|---|---|---|---|
| IP ADDRESS 7 | – | – | – |

FIG. 3D

|  | EACH LEVEL ATTENTION DIGIT 0 | EACH LEVEL ATTENTION DIGIT 1 | EACH LEVEL ATTENTION DIGIT 2 | EACH LEVEL ATTENTION DIGIT 3 |
|---|---|---|---|---|
| LEVEL 1 | 0130 | 1023 | 2203 | 3220 |
|  | IP ADDRESS 0 | – | IP ADDRESS 2 | IP ADDRESS 3 |
| LEVEL 2 | 1023 | 1132 | 1202 | 1321 |
|  | – | IP ADDRESS 4 | IP ADDRESS 5 | IP ADDRESS 6 |
| LEVEL 3 | 1000 | – | 1023 | – |
|  | IP ADDRESS 7 | – | – | – |
| LEVEL 4 | – | – | – | 1023 |
|  | – | – | – | – |

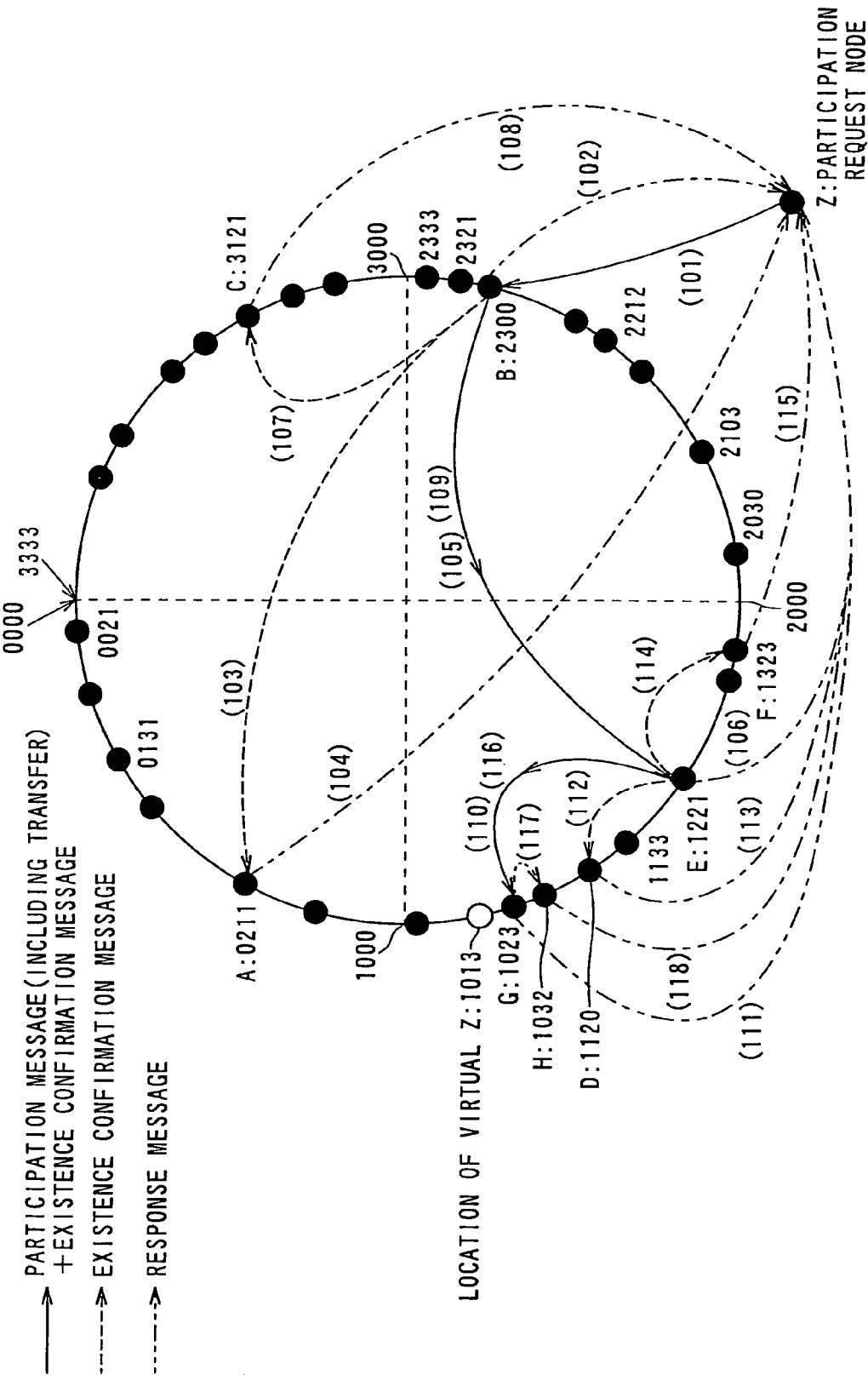

FIG. 6A
NODE B:2300

|  |  | ATTENTION DIGIT X OF EACH LEVEL=0 | ATTENTION DIGIT X OF EACH LEVEL=1 | ATTENTION DIGIT X OF EACH LEVEL=2 | ATTENTION DIGIT X OF EACH LEVEL=3 |
|---|---|---|---|---|---|
| LEVEL 1 | X*** | 0211 | 1221 | 2300 | 3121 |
|  |  | NODE A | NODE E | — | NODE C |
| LEVEL 2 | 2X** | 2030 | 2103 | 2212 | 2300 |
|  |  | NODE * | NODE * | NODE * | — |
| LEVEL 3 | 23X* | 2300 | BLANK | 2321 | 2333 |
|  |  | — |  | NODE * | NODE * |
| LEVEL 4 | 230X | 2300 | BLANK | BLANK | BLANK |
|  |  | — |  |  |  |

FIG. 6B
NODE E:1221

|  |  | ATTENTION DIGIT X OF EACH LEVEL=0 | ATTENTION DIGIT X OF EACH LEVEL=1 | ATTENTION DIGIT X OF EACH LEVEL=2 | ATTENTION DIGIT X OF EACH LEVEL=3 |
|---|---|---|---|---|---|
| LEVEL 1 | X*** | 0021 | 1221 | 2300 | 3201 |
|  |  | NODE * | — | NODE B | NODE * |
| LEVEL 2 | 1X** | 1023 | 1120 | 1221 | 1323 |
|  |  | NODE G | NODE D | — | NODE F |
| LEVEL 3 | 12** | BLANK | 1213 | 1221 | 1230 |
|  |  |  | NODE * | — | NODE * |
| LEVEL 4 | 122X | BLANK | 1221 | BLANK | BLANK |
|  |  |  | — |  |  |

FIG. 6C
NODE G:1023
NO TRANSFER DESTINATION→ROOT NODE

|  |  | ATTENTION DIGIT X OF EACH LEVEL=0 | ATTENTION DIGIT X OF EACH LEVEL=1 | ATTENTION DIGIT X OF EACH LEVEL=2 | ATTENTION DIGIT X OF EACH LEVEL=3 |
|---|---|---|---|---|---|
| LEVEL 1 | X*** | 0131 | 1023 | 2212 | 3301 |
|  |  | NODE * | — | NODE * | NODE * |
| LEVEL 2 | 1X** | 1023 | 1133 | 1221 | 1311 |
|  |  | — | NODE * | NODE E | NODE * |
| LEVEL 3 | 10X* | BLANK | BLANK | 1023 | 1032 |
|  |  |  |  | — | NODE H |
| LEVEL 4 | 102X | BLANK | BLANK | BLANK | 1023 |
|  |  |  |  |  | — |

NODE Z:1013

| | | ATTENTION DIGIT X OF EACH LEVEL=0 | ATTENTION DIGIT X OF EACH LEVEL=1 | ATTENTION DIGIT X OF EACH LEVEL=2 | ATTENTION DIGIT X OF EACH LEVEL=3 |
|---|---|---|---|---|---|
| LEVEL 1 | X*** | 0211 | 1013 | 2300 | 3121 |
| | | NODE A | — | NODE B | NODE C |
| LEVEL 2 | 1X** | 1013 | 1120 | 1221 | 1323 |
| | | — | NODE D | NODE E | NODE F |
| LEVEL 3 | 10X* | BLANK | 1013 | 1023 | 1032 |
| | | | — | NODE G | NODE H |
| LEVEL 4 | 101X | BLANK | BLANK | BLANK | 1013 |
| | | | | | — |

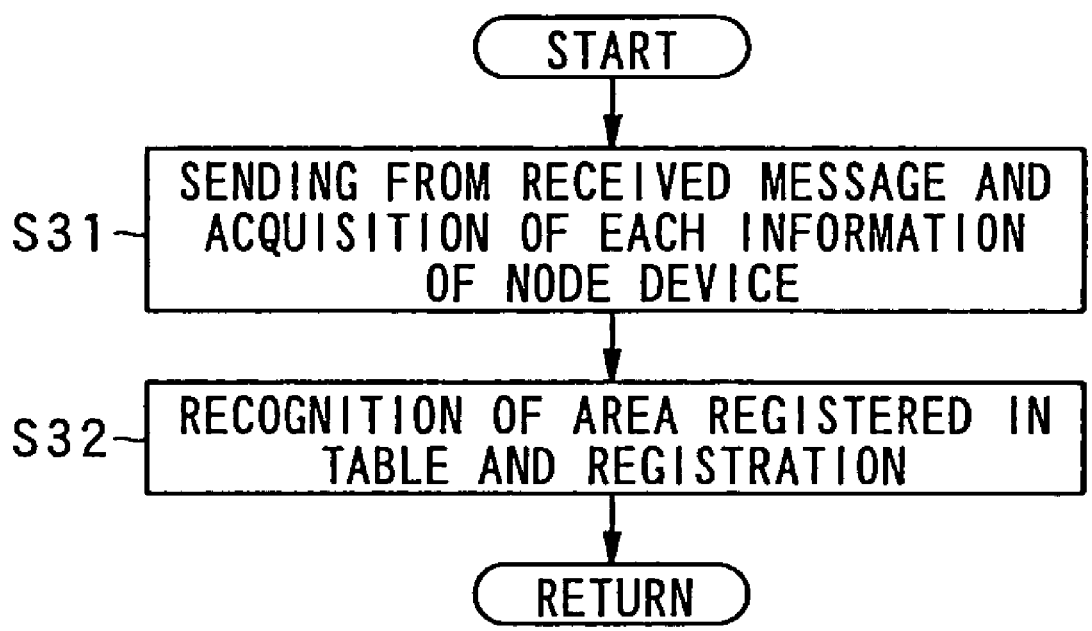

INFORMATION COMMUNICATION SYSTEM, INFORMATION COMMUNICATION METHOD, NODE DEVICE INCLUDED IN INFORMATION COMMUNICATION SYSTEM AND RECORDING MEDIUM RECORDING INFORMATION PROCESS PROGRAM

The entire disclosures of Japanese Patent Application No. 2006-110626 filed on Apr. 13, 2006 including the specification, claims, drawings and summary are incorporated herein by reference in its entirety.

BACKGROUND OF THE INVENTION

1. Field of the Invention

The present invention relates to a peer-to-peer (P2P) type information communication system including a plurality of node devices mutually connected through a network, a method thereof, and the like.

2. Discussion of Related Art

A technology of peer-to-peer has been paid attention recently. With respect to a peer-to-peer type information communication system, in an overlay network logically built using a distributed hash table (hereinafter referred to as DHT), each node device does not necessarily recognize link information (e.g. IP address) to all the node devices participating in the overlay network but retains (memorizes) only link information to a portion of node devices obtained at the time of participation, and data inquiry or the like is made based on such the link information.

In such the overlay network, even in a case where participation and withdrawal (separation) of node devices are often repeated, a load thereto should be appropriately distributed. There is disclosed in "Lightweight Load Balancing for Distributed Hash Table" by Toshio Oka, Hiroyuki Morikawa, Tomonori Aoyama; Technical report of the Institute of Electronics, Information and Communication Engineers Feb. 5, 2004, Vol. 103, No. 650, p. 7-12, that an art of an overlay network wherein load is appropriately distributed even in a case where participation and withdrawal (separation) are often repeated.

SUMMARY OF THE INVENTION

A node device sends a participation request message to a previously recognized contact node when newly participating in an overlay network. By an action of a contact node and other node devices to be described below, there may be a mode that a node device being a sending source of a participation request message (hereinafter referred to as participation request node) acquires link information of the other node device, and creates a DHT routing table.

The contact node returns link information of the other node device registered in the stage of the largest bundle of the DHT routing table when receiving the participation request message from the participation request node. Further, the contact node transfers the participation request message to the other node device in a case where the own node device is not a root node of the participation request node (inherent identification information (node ID) corresponding to the link information being the node device closest to the participation request node). When transferring the participation request message, the contact node sends together with information of the next stage where returning the link information to the participation request node.

The node device receiving thus transferred participation request message sends the link information of the corresponding node device to the participation request node based on information at the stage of returning the link information. Further, in a case where the own node device is not the root node of the participation request node, this node device transfers the participation request message to the other node device. When further transferring the participation request message, the node device has the participation request message transferred sends together with information at the further next stage where link information is returned to the participation request node.

Thus, the node device receiving the participation request message transferred to the root node of the participation request node returns link information at the respective prescribed stages to the participation request node.

The participation request node receiving link information one after another creates a DHT routing table based on the respective link information.

However, when the participation request node creates the routing table according to the above-mentioned procedures, there is a possibility that information of the node device already withdrawing from the overlay network is included in the received link information of the other node devices. Then in a case where information is desired to send to the withdrawn node device or the node device having the node ID close thereto, information transfer may be delayed.

Thus the present invention is provided in view of the above problems, and an object of the present invention is to provide a peer-to-peer type information communication system including plural node devices mutually connected through a communication route and a method thereof, wherein a participation request node can acquire link information of the node device participating in (not withdrawing from) the overlay network.

To solve the above described problem of the present invention, according to the first aspect of the invention, there is provided an information communication system having an overlay network formed by participation of a plurality of node devices, mutually connected through a communication route, a node device included in the plurality of node devices including:

a memory means for memorizing node information indicative of a node device to be a candidate of information transfer destination;

a participation request information transfer means for judging whether or not node information indicative of a node device of a transfer destination in response to node information of the participation request node device is memorized, in a case where a participation request into the overlay network is indicated and participation request information including the node information of the participation request node device requesting participation is received, and for transferring the participation request information to the node device, in a case where the node information indicative of the node device of the transfer destination is memorized;

an existence confirmation information sending means for judging whether or not node information indicative of a node device other than the transfer destination in response to the node information of the participation request node device being a sending source of the participation request information is memorized, in a case where the participation request information is received, and for sending existence confirmation information including the node information of the participation request node device to the node device, in a case where the node information indicative of the node device other than the transfer destination is memorized; and a return information sending means for sending return information to the participation request node device in a case where the existence confirmation information is received.

According to this, the participation request node can confirm an issue that a node device on a transmission source of return information participates in an overlay network because existence confirmation information sending means of a node device receiving the participation request sends existence confirmation information to other node devices, and a return information sending means of a node device receiving the existence confirmation information sends the return information to the participation request node device (hereafter referred to as participation request node). Therefore, it is possible for the participation request node newly participating in the overlay network can acquire node information (e.g. IP address) being a link information of the node device assuredly participating in the overlay network. The participation request node memorizes each node information into the memory means on the basis of the node information and so on thus acquired.

The node device on the sending source of the existence confirmation information can confirm that another node device exists in a case where the existence confirmation information can be successfully sent, and can confirm that the other node device does not exist in a case where the existence confirmation information can not be successfully sent, wherein operation for confirming the existence is also carried out with efficiency.

BRIEF DESCRIPTION OF THE DRAWINGS

FIG. 2 is a view showing a state that an ID space by DHT and a routing table are created.

FIG. 3(A) is an example of table level 1, (B) is an example of table level 2, (C) is an example of table level 3, and (D) is an example of a completed routing table.

FIG. 5 is a view showing a state that a DHT routing table is created after a node device 1 participates in an overlay network.

FIGS. 6(A) to (C) show respective views of a DHT routing table memorized in another node device 1.

FIG. 10 is a flowchart showing a process of registering in a table of another node device 1.

DESCRIPTION OF THE PREFERRED EMBODIMENTS

Figure 1:
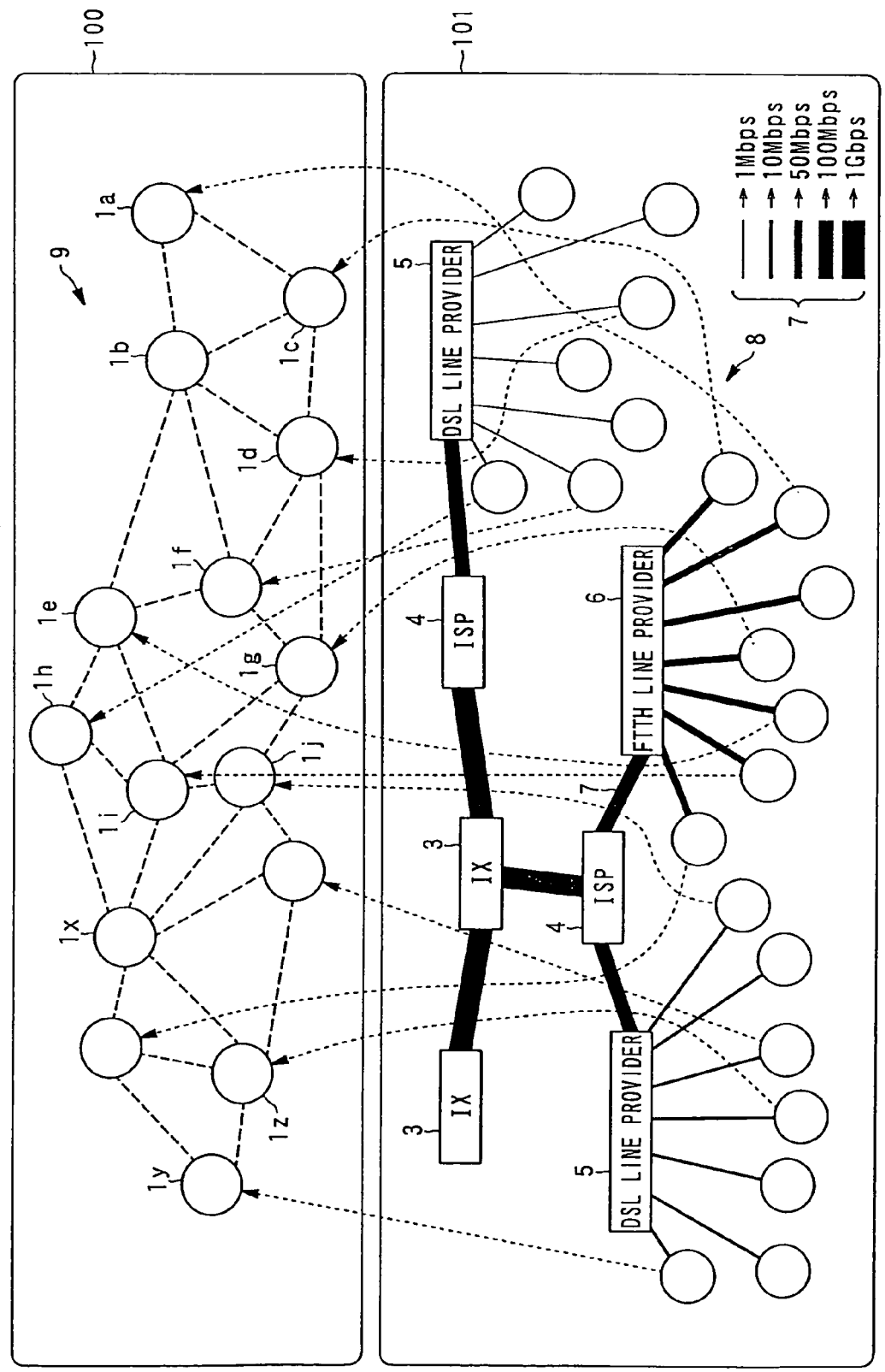
FIG. 1 is a view showing an example of connection status of respective node devices in an information communication system related to the present embodiment.

Hereinafter, each designation of numerical reference in the drawings is typically as follows:
1: Node device;
8: Network;
9: Overlay network;
11: Control unit;
12: Memory unit;
13: Buffer memory;
14: Decoder;
15: Image processing unit;
16: Display unit;
17: Audio processing unit;
18: Speaker;
20: Communication unit;
21: Input unit;
22: Bus; and
S: Information communication system.

THE BEST MODE FOR CARRYING OUT THE CLAIMED INVENTION

Hereinafter, embodiments of the present invention will be described in reference of drawings. Here, the embodiments explained below is a case where the present invention is applied to an information communication system using DHT, an IP address as node information, and a node ID as identification information. According to the present embodiment, in the information communication system, a node device (participation request node) newly participating in the overlay network sends a participation message as participation request information to a contact node being an arbitrary node device, and the participation request node creates a DHT routing table by utilizing an existence confirmation message as existence confirmation information and a response message as return information. Here, inventions of information communication system and the like according to the present invention are not limited to the embodiments described below and can be practiced by appropriately modifying within a scope of technical concept of the present invention.

[1. Configuration and the Like of Information Communication System]

First, with reference to FIG. 1, schematic configuration and the like of an information communication system is described.

FIG. 1 is a view showing an example of connection status of respective node devices in an information communication system according to the present embodiment.

As shown in lower frame 101 in FIG. 1, a network (network in the real world) 8 such as Internet is constructed by an internet exchange (IX) 3, internet service providers (ISP) 4, digital subscriber line (DSL) providers (or device thereof) 5, fiber to the home (FTTH) line provider (or device thereof) 6, and communication line (e.g. a phone line or an optical cable) 7 and the like.

The information communication system S is provided with plural node devices 1a, 1b, 1c . . . 1x, 1y, 1z . . . , which are mutually connected through such the network 8, is a peer-to-peer type network system. An inherent manufacturing number and an IP (Internet Protocol) address as information showing the node device (node information in the present invention) are allocated to each of the node devices 1a, 1b, 1c . . . 1x, 1y, 1z . . . . Such manufacturing numbers and IP addresses do not overlap among plural node devices 1. Here, in some cases, any one of the node devices 1a, 1b, 1c . . . 1x, 1y, 1z . . . is referred to as a node device 1 for convenience.

[1.1 Outline of DHT]

Next, algorithm using a distributed hash table (hereinafter referred to as "DHT") related to the present embodiment is described.

In the above-mentioned information communication system S, the node devices 1 should know an IP address as node information with each other when they exchange information with each other.

For example, in a system where contents are shared with each other, there is a simple method that respective node devices 1 participating in the network 8 know IP addresses of all the node devices 1 participating in the network 8. However, it is not realistic to memorize IP addresses of all the node devices 1 when the number of terminals becomes large, tens of thousands or hundreds of thousands. Further, when arbitrary node devices are turned on or turned off, operation becomes difficult because the IP addresses of the arbitrary node devices memorized in the respective node devices 1 are frequently updated.

Therefore, there is devised a system such that, as to information of a unit of node device 1, only IP addresses of necessary minimum node devices 1 having the information are learned (memorized) among all the node devices 1 participating in the network 8, and as to information in a node device 1 of which IP address is unknown (not memorized), the information is mutually transferred and delivered among the node devices 1.

As an example of such the system, an overlay network 9 is configured by an algorithm using DHT as shown in an upper frame 100 of FIG. 1. In other words, the overlay network 9 means a network configuring a virtual link formed by use of an existing network 8.

In the present embodiment, as a prerequisite for an overlay network 9 configured by the algorithm using DHT, a node device 1 allocated to this overlay network 9 is referred to as a node device 1 participating in the information communication system S (i.e. participating in the overlay network 9). Here, participation into the information communication system S is done when a node device not yet participating (participation request node) sends a participation request information (hereinafter referred to as participation message) to an arbitrary node device 1 already participating (referred to as contact node). Here, the participation message as the participation request information indicates participation request into the overlay network and includes node information of the participation request node for requesting the participation.

Node IDs (identification information) of the respective node devices 1 participating in the information communication system S provides unique (inherent) number to respective node devices. The number is required to accommodate a bit number enough to include maximum operation number of node devices. For example, when the number is 128-bit number, the node can operate node devices of units of $2^{128}=340\times 10^{36}$.

More specifically, the node IDs of the respective node devices 1 are hash values obtained by hashing an inherent value such as IP address or manufacturing number of the respective node devices by a common hash function (hash algorithm), and are distributed and located in one ID space without deviation. Such the node ID obtained (hashed) by a common hash function has a very low possibility of having the same value if the IP address or the manufacturing number differs. Here, detailed explanation is omitted because the hash function is well known. Here, in the present embodiment, a value hashing IP address (global IP address; node information) by a common hash function is referred to as a node ID (GUID (Global Unique Identifier); identification information).

[1.2 Creation of Routing Table]

Next, an example of a method of creating a routing table used in DHT is explained with reference to FIG. 2. FIG. 2 is a view showing an example of creating a routing table using DHT.

Because the node IDs provided to respective node devices 1 are generated by a common hash function, they are considered to be dispersed and located in an identical ring-shaped ID space without large deviation as shown in FIGS. 2(A) to 2(C).

In the figures, the node ID is provided at 8 bits and illustrated. A black dot in the figures indicates a node ID, and ID increases counterclockwise.

First, as shown in FIG. 2(A), the ID space is divided into several areas. Although actually the ID space divided into about sixteen areas is often used, the ID space is quadrisected for easy explanation here, and ID is expressed by quaternary number of bit length of 8 bits. A node ID of a node device 1N is set to "1023", and an example of creating a routing table of this node device 1N is explained.

(Routing Level 1)

When the ID space is quadrisected, it is divided into four areas having different maximum digit, "0XXX", "1XXX", "2XXX", and "3XXX" (X being integer number of 0 to 3, similar to this hereinafter) that are expressed by quaternary number. Because the node ID of the node device 1N itself is "1023", the node device 1N is located in the area "1XXX" at the lower left of the figure. The node device 1N appropriately selects the node device 1 located in the area other than the area where the own exists (i.e. the area "1XXX"), and memorizes the IP address of the node ID in the table level 1. FIG. 3(A) is an example of the table level 1. Since the second column indicates the node device 1N itself, the IP address is not necessary to be registered.

(Routing Level 2)

Next, as shown in FIG. 2(B), among the areas thus quadrisected by routing, the area where the own exists is further quadrisected into four areas "10XX", "11XX", "12XX", and "13XX". In a manner similar to the above, the node device 1 existing in an area other than the area where the own exists is appropriately selected, and the IP address of the node ID is memorized in the table level 2. FIG. 3(B) is an example of the table level 2. Since the first column indicates the node device 1N itself, the IP address is unnecessary to be registered.

(Routing Level 3)

Next as shown in FIG. 2(C), among the areas thus quadrisected by the routing, the area where the own exists is further quadrisected into four areas "100X", "101X", "102X", and "103X". In a manner similar to the above, the node device 1 existing in an area other than the area where the own exists is appropriately selected, and the IP address of the node ID is memorized in the table level 1. FIG. 3(C) is an example of the table level 3. Since the third column indicates the node device 1N itself, the IP address is not necessary to be registered.

The second column and the fourth column are blank because no node device exists in the area.

In such a way, routing tables are created up to level 4 as shown in FIG. 3(D) to cover all 8-bit IDs. Blank in the table becomes outstanding as the level increases.

All node devices 1 respectively create and retain the routing table created in accordance with the above-mentioned methods. Thus, the node device 1 creates the DHT routing table memorizing the IP address of other node devices 1. In this embodiment, the node device 1 memorizes the IP address as node information, the node ID as identification information, and the area of the node ID space as a region where the identification information belongs, or respective levels and respective columns of DHT, in correspondence with one another. Here, the node device corresponding to the node ID closest to the node ID of the own node device 1N is referred to as a root node described below (node device having node ID: 1000 in FIGS. 2(C) and 3(D)).

Here, the number of levels is determined in response to the number of digits of the node ID, and the attention digit number of respective levels in FIG. 3(D) is determined in response to the base number. Specifically, in a case of 16-digit hexadecimal number, ID is 64 bits and the number of alphanumeral of attention digits in level 16 is 0 to f. In explanation of the routing table described below, a portion indicating the attention digit number of the respective levels is also simply called "column" or "column number".

[2. Configuration and the Like of Node Device]

Figure 4:
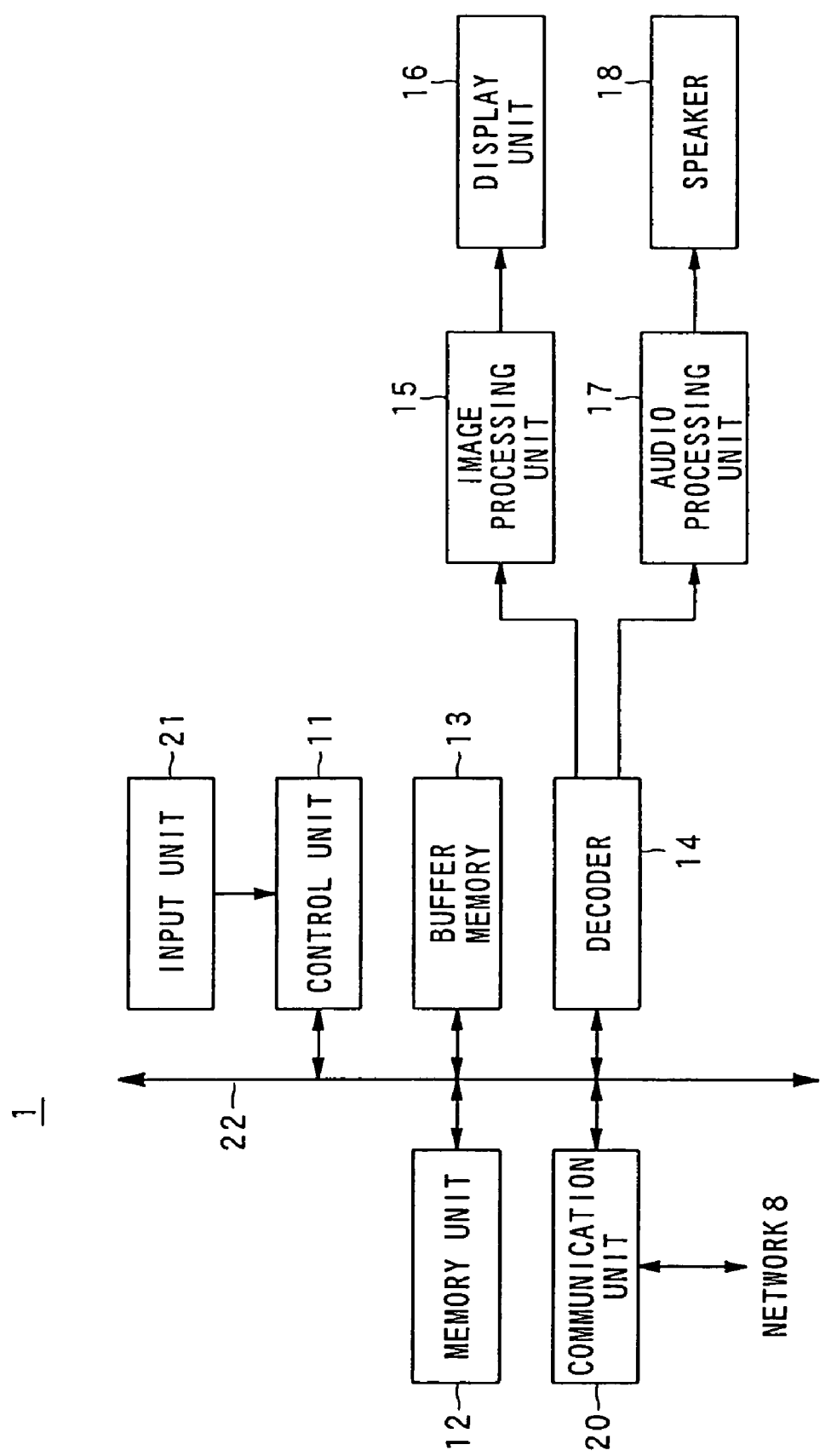
FIG. 4 is a view showing an example of schematic configuration of a node device 1.

Next, with reference to FIG. 4, configuration and function of the node device 1 is explained. Here, the configurations of respective node devices 1 are the same. FIG. 4 is a view showing a schematic configuration example of the node device 1.

The respective node devices 1 are configured by including, as shown in FIG. 4, a control unit 11 being a computer configured by a CPU having computing function, a RAM for work, a ROM for memorizing various data and programs, or the like; a memory unit 12, as a memory means, configured by an HD or the like for memorizing (storing) content data, index information, the above-mentioned DHT, program, or the like (the above-mentioned content data being not stored in some node devices 1); a buffer memory 13 for temporarily storing received content data or the like; a decoder 14 for decoding (stretching data and the like) encoded video data (image information), audio data (audio information) or the like included in the content data; an image processing unit 15 for providing a predetermined graphic process to the video data or the like thus decoded and outputting the data as video signal; a display unit 16 such as CRT or liquid crystal display for displaying image based on the video signal outputted from the image processing unit 15; an audio processing unit 17 for converting the thus decoded audio data into an analog audio signal in use of digital/analog (D/A) conversion, amplifying thus converted signal by an amplifier and outputting the same; a speaker 18 for outputting the audio signal thus outputted from the audio processing unit 17 as acoustic wave; a communication unit 20 for carrying out communication control of information with other node devices 1 via the network 8; and an input unit 21 (e.g. a keyboard, a mouse, or an operation panel) for receiving instruction from a user and providing the instruction signal corresponding to the instruction to the control unit 11, wherein the control unit 11, the memory unit 12, the buffer memory 13, the decoder 14, and the communication unit 20 are mutually connected each other via a bus 22.

When CPU in the control unit 11 executes various programs memorized in the memory unit 12 or the like, the control unit 11 entirely controls the node device 1. Further, the control unit 11 carries out a content data registration process or the like according to an instruction signal from the input unit 21. The node device 1 functions as a node device for sending (transferring) information and as a node device for receiving information according to executed programs. Further, the control unit 11 of the node device 1 functions as a participation request information transfer means, an existence confirmation information sending means, a return information sending means, and a node information sending means.

[3. Outline of Information Communication System]

Next, outline of the information communication system S of the present embodiment is explained with reference to FIGS. 5 to 7. After participating in the overlay network, one node device receives a response message as return information from the other node device to thereby create the DHT routing table based on information of the node device of response message sending source. In the explanation below, the participation request node is set up to a node Z and an arbitrary node device which already knows the IP address and the node Z first communicates with (hereinafter referred to as contact node) is set up to a node B.

Hereinafter, DHT routing table is also simply referred to as "table". Further, memory of the node information and the identification information of the other node device is also referred to as "registration".

FIG. 5 is a schematic view showing a flow of respective messages for creating the DHT routing table after the participation request node participates in the information communication system S. The respective views of FIG. 6 are examples of DHT routing tables respectively memorized by the node B, the node E and the node G already participating in the information communication system S. FIG. 7 is an example of the DHT routing table created when the node Z receives the return information (response message).

As shown in FIG. 5, when one node device 1 (node Z) participates in the communication network in the information communication system S, the node Z sends the participation message as participation request information to the node B being a contact node (arrow mark 101). Then the node A confirms that the node B exists when the participation message (arrow mark 102) is successfully sent. Next, the node B sequentially sends an existence confirmation message as existence confirmation information to the node A, the node E, and the node C that are registered in level 1 as shown in FIG. 6(A) (arrow marks 103, 105, and 107). Then the node A sends the response message to the node Z (arrow mark 104), the node E sends the response message to the node Z, and the node C sends the response message to the node Z (arrow mark 108). Here, in FIGS. 6(A) to 6(C), a black triangle mark means that the existence confirmation message is sent to the node device registered in the level thereof, and the node device enclosed by dual squares means that the participation message is to be sent to the node device.

Figures 7, 8:
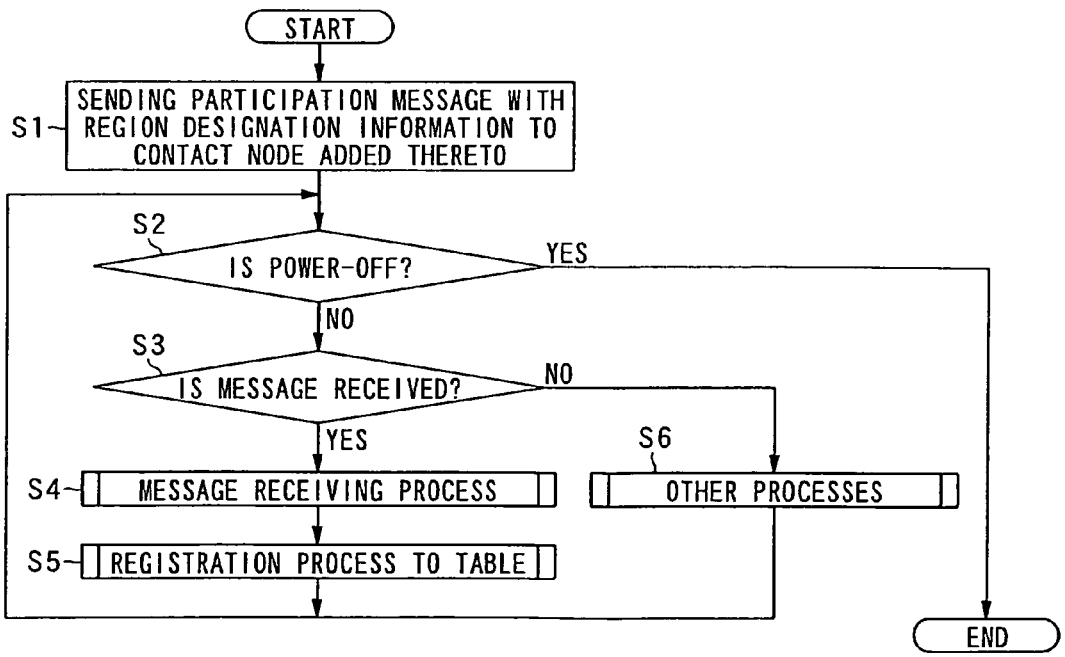
FIG. 7 is a view showing the DHT routing table created by a node Z being participation request node.
FIG. 8 is a flowchart showing a basic process in a node device 1.

At this time, the node Z can memorize the IP address and the node ID corresponding thereto in association with each other to thereby acquire the IP address of the node A, the node B, the node C, and the node E in the table of FIG. 7.

Then the node B transfers the participation message to the root node of the node Z, or the node E in this case (arrow mark 109). At this time region designation information that the sending destination of the existence confirmation message is the next level 2 is added to the participation message. Next as shown in FIG. 6(B), the node E sequentially sends the existence confirmation message to the node G, node D, and node F registered in the next level 2 (arrow marks 110, 112, and 114). Then the node G sends the response message to the node Z (arrow mark 111), and the node D sends the response message to the node Z (arrow mark 113), and the node F sends the response message to the node Z (arrow mark 115).

At this time, the node Z can memorize the IP address and the node ID of the node D, node F, and node C in the table in FIG. 7.

The node E transfers the participation message to the root node of the node Z, node G in this case (arrow mark 116). Here the region designation information that the sending destination of the existence confirmation message is the next level 3 is added to the participation message. Next, the node G sends the existence confirmation message to the node H registered in the next level 3 (arrow mark 117). Then the node H sends the response message to the node Z (arrow mark 118). Here since the node G is the root node of the node Z, which has no further transfer destination, the process is finished.

Here the node Z can memorize the IP address and the node ID of the node H in the table of FIG. 7, and can create the DHT routing table shown in FIG. 7 according to the flow mentioned above. Since this table of the node Z is created based on the response message received from the respective existing node devices and the other node device 1 memorized in the table is withdrawn, the probability of delay in information transfer or sending based on the table becomes low. Therefore, communication efficiency is improved for the information communication system S as a whole.

[3.1 Operation of Information Communication System in the Present Embodiment]

Next, operation of the respective node devices 1 in the information communication system S of the present embodiment will be described with reference to FIGS. 5 to 10. Processes in the respective node devices 1 after one node device 1 (the above-mentioned node Z) participates in the communication network in the information communication system S will be explained with reference to flowcharts of FIGS. 8 to 10. Here, although the respective processes are explained by taking some node devices 1 as an example, any node devices 1 are also processed in similar manner.

(1) Basic Process of Node Device

A basic process of the node device 1 (node Z) is explained with reference to FIG. 8. The node Z creates and retains (memorizes) a DHT routing table shown in FIG. 7 according to the process shown in FIG. 5 as mentioned above after participating in a communication network.

When a control unit 11 of a node Z recognizes that the own node device is powered in by an input unit 11 or the like, various settings of the node Z are initialized and the basic process starts (Start). Here, it is based on a premise that the node Z retains an IP address of a contact node device 1 (node B) which the node Z first communicates with when the node Z participates in the communication network.

When the basic process is started, the control unit 11 sends a participation message designating a level 1 as region designation information to the contact node (node B) (Step S1). Here, the control unit 11 of the node Z confirms that the contact node B exists when communication with the contact node B is established for sending the participation message. As shown in Step S32 of FIG. 10 described later, information of the node B is enabled to be registered in the table. Next, the control unit 11 judges whether or not the power is off (Step S2), judges that the power is not off because usually the power is not turned off immediately after the power is turned on (Step S2; NO), and judges whether or not a message (information) is received from other node device 1 (Step S3). This time, because a response message is received at least from a node A, the control unit 11 judges that the message is received from the other node device 1 (node A) (Step S3; YES), and carries out the message receiving process (Step S4). Here, the message receiving process is described later with reference to FIG. 9.

Next, the control unit 11 registers the node device 1 (node B) of a sending source of the received message in the table (Step S5). This table registration process is described later with reference to FIG. 10. This time, information of the node A is registered in level 1 and area of each level attention digit X=0 in the table of the node Z (Refer to FIG. 7).

Next, the control unit 11 returns to Step S2. In a case where the power is not turned off (Step S2; NO) and the message is not received (Step S3; NO), the control unit 11 carries out the other process responsive to the input from the input unit 21 or the like (Step S6). Then the process returns to Step S2. The control unit 11 of the node Z repeats operations of Steps S2 to S5 or Steps S2, S3 and S6 responsive to cases. In a case where the power of the node Z is turned off, the control unit 11 judges so (Step S2; YES) and finishes the basic process (End).

(2) Message Receiving Process of Node Device

A message receiving process of node Z, node B, node E, node G, and node A is described with reference to FIG. 9.

(Node Z)

When a message receiving process (Step S4) in the above-mentioned basic process starts, the control unit 11 of the node Z starts this message receiving process (Start). Here, explanation is given on a premise that a response message is first received from the node A.

When the message receiving process starts, the control unit 11 judges whether or not thus received message is a participation message (Step S11). Here, since the received message is the response message, the control unit 11 judges that the received message is not a participation message (Step S11; NO). Next, the control unit 11 judges whether or not the received message is an existence confirmation message (Step S12).

Here, since the received message is the response message, the control unit 11 judges that the received message is not the existence confirmation message (Step S12; NO). Next, the control unit 11 judges whether or not the received message is the response message (Step S13). Here, the control unit 11 judges that the received message is the response message (Step S13; YES) and returns to the original process flow (Return).

(Node B)

On the other hand, the message receiving process in a case where the participation message is received from the node Z participating in the communication network, in the contact node B, is described below. The node B memorizes the table shown in FIG. 6(A).

When the control unit 11 of the node B receives the participation message and the message receiving process (Step S4) in the above-mentioned basic process starts, the control unit 11 starts this message receiving process (Start). When, in Step S11, the control unit 11 of the node B judges that the received message is the participation message (Step S11; YES), the control unit 11 acquires region designation information indicative of level 1 included in the participation message (Step S14). The control unit 11 determines the level number 1 in the table in response to the region designation information of this participation message (Step S15).

Next, the control unit 11 determines the column number (each level attention digit X) in the table as 0 (Step S16), and pays attention to an area of level 1 and attention digit X=0 in FIG. 6(A) showing the table of the node B.

The control unit 11 judges whether or not thus determined column number is not larger than the column number of the entire table (Step S17). Since the determined column number 0 is not larger than the entire table column number 3 (Step S17; YES), the control unit 11 judges whether or not the node device falling into the attention [level number] [column number] is the own node device (Step S18).

Here, since the node device falling into the attention [level number 1] [column number 0] is not the own node device as shown in FIG. 6(A), the control unit 11 judges so (Step S18; NO). Next, the control unit 11 judges whether or not information of the other node device is memorized in the attention [level number] [column number] (Step S19).

Here, since the node device of the node ID [0211] is memorized in [level number 1] [column number 0], the control unit 11 judges so (Step S19; YES), creates the existence confirmation message including the IP address of the node Z being a participation message sending source, and sends the existence confirmation message to the node device (node A) of a node ID [0211] memorized in [level number 1] [column number 0] (Step S20). Here, the message sending process is considered to succeed here.

Next, the control unit 11 judges whether or not the message sending process succeeds (Step S21), and in this case, since sending process of the existence confirmation message succeeds, the control unit 11 judges so (Step S21; YES). Next, the control unit 11 adds 1 to the column number 0 to make a column number 1 (Step S22) and returns to Step S17.

Next, going through Step S17; YES, Step S18; NO, Step S19; YES, Step S20, and Step S21; YES, the control unit 11 sends the existence confirmation message to the node device (node E) of the node ID [1221] memorized in [level number 1] [column number 1], adds 1 to the column number 1 to make a column number 2 (Step S23) and returns to Step S17.

Next, going through Step S17; YES, the control unit 11 judges the area of [level number 1] [column number 2] is the own node device in Step S18 (Step S19; YES), adds 1 to the column number 2 to make a column number 3 (Step S22), and returns to Step S17.

Next, going through Step S17; YES, Step S18; NO, Step S19; YES, Step S20, and Step S21; YES, the control unit 11 sends the existence confirmation message to the node device (node C) of the node ID [3121] memorized in [level number 1] [column number 3], adds 1 to the column number 3 to make a column number 4 (Step S22), and returns to Step S17.

Here, the control unit 11 judges whether or not the determined column number is not larger than the column number of the entire table (Step S17), and since the determined column number 4 is not larger than the column number 3 of the entire table (Step S17; NO), the control unit 11 recognizes the node device of the participation message transfer destination (sending destination) (Step S23). Here, as explained with reference to FIG. 2, since the node device closest to the node ID [1013] of the node Z being the participation request node is the node E of the node ID [1221], the node E is recognized as transfer destination of the participation message.

Next, the control unit 11 judges whether or not the own node device is the node device which is the closest to the node ID [1013] of the root node, or the node Z being the participation request node (Step S24). As mentioned above, here, the node device closest to the node ID [1013] of the node Z being the participation request node is the node E having the node ID [1221], and the own node device is not the root node. Therefore, the control unit 11 judges so (Step S24; NO), and creates the participation message which is added with level number information adding 1 to the attention level number as the region designation information and transfers to the transfer destination recognized in Step S24 (Step S25), and returns to the original process flow (Return). Here, the control unit 11 adds the region designation information of level number 2 where 1 is added to the attention level number being 1, to the participation message, transfers to the node E, and returns to the original flow.

(Node E)

Next, in the node E, the participation message is transferred from the node B, and the message receiving process when the message is received is described below. The node E is assumed to memorize the table shown in FIG. 6(B).

When the control unit 11 of the node E receives the participation message and the message receiving process (Step S4) in the above-mentioned basic process starts, the control unit 11 starts this message receiving process (Start). In Step S1, when the control unit 11 of the node E judges that thus received message is the participation message (Step S11; YES), it acquires the region designation information indicative of level 2 included in the participation message (Step S14). The control unit 11 determines the level number in the table as level number 2 in response to the region designation information of this participation message (Step S15).

Next, the control unit 11 determines the column number (each level attention digit X) in the table as 0 (Step S16) and notices the area of level 2, attention digit X=0 in FIG. 6(B) showing the table of the node E. The control unit 11 judges whether or not the determined column number is smaller than the column number of the entire table (Step S17). Since the determined column number 0 is smaller than the column number 3 of the entire table (Step S17; YES), the control unit 11 judges whether or not the node device corresponding to the attention [level number] [column number] is the own node device (Step S18).

Here, since the node device corresponding to the attention [level number 2] [column number 0] is not the own node device as shown in FIG. 6(B), the control unit 11 judges so (Step S18; NO), and then judges whether or not information of the other node device is memorized in the attention [level number] [column number] (Step S19).

Here, since the node device of the node ID [1023] is memorized in [level number 2] [column number 0], the control unit 11 judges so (Step S19; YES), creates the existence confirmation message including the IP address of the node Z being the participation request node, and sends the message to the node device (node G) of the node ID [1023] memorized in [level number 2] [column number 0] (Step S20). Here the message sending process is considered to succeed.

Next, the control unit 11 judges whether or not the message sending process succeeds (Step S21). Here since the message sending process of the existence confirmation message succeeds, the control unit 11 judges so (Step S21; YES). Next, the control unit 11 adds 1 to the value of the column number 0 to make the column number 1 (Step S22) and returns to Step S17.

Next, the control unit 11 goes through Step S17; YES, Step S18; NO, Step S19; YES, Step S20, and Step S21; YES, sends the existence confirmation message to the node device (node D) of the node ID [1120] memorized in [level number 2] [column number 1], adds 1 to the value of the column number 1 to make the column number 2 (Step S22), and returns to Step S17.

Next, the control unit 11 goes through Step S17; YES, judges that the area of [level number 2] [column number 2] is the own node device in Step S18 (Step S18; YES), adds 1 to the value of column number 2 to make the column number 3 (Step S22), and returns to Step S17.

Next, the control unit 11 goes through Step S17; YES, Step S18; NO, Step S19; YES, Step S20, and Step S21; YES, sends the existence confirmation message to the node device (node F) of the node ID [1323] memorized in [level number 2] [column number 3], adds 1 to the value of the column number 3 to make the column number 4 (Step S22), and returns to Step S17.

Here, the control unit 11 judges whether or not the determined column number is smaller than the column number of the entire table (Step S17). Since the determined column number 4 is not smaller than the column number 3 of the entire table (Step S17; NO), the control unit 11 recognizes the node device of the participation message transfer destination (sending destination) (Step S23). At this time, since the node device which is the closest to the node ID [1013] of the node Z being the participation request node is the node G of the node ID [1023], the control unit 11 recognizes the node G as the participation message transfer destination.

Next, the control unit 11 judges whether or not the own node device is the node device which is the closest to the node ID [1013] of the node Z being the root node or the participation request node (Step S24). As mentioned above, here, since the node device closest to the node ID [1013] of the node Z being the participation request node is the node G of the node ID [1023] and the own node device is not the root node, the control unit 11 judges so (Step S24; NO), and creates the participation message added with information of level number where 1 is added to the attention level number, as region designation information. The control unit 11 transfers to the other node recognized as a transfer destination (Step S25) and returns to the original process flow (Return). Here, the attention level number is 2, and the control unit 11 adds the region designation information of level number 3 where 1 is added to the level number 2, to the participation message. The control unit 11 sends it to the node G of the transfer destination and returns to the original process flow.

Here, in a case where the message sending process is failed in Step S20, the control unit 11 judges that the message sending process does not succeed in Step S21 (Step S21; NO), deletes information such as IP address of the node device 1 of the corresponding [level number] [column number] from the table (Step S26), and returns to Step S22.

(Node G)

Next, in the node G, the participation message is transferred from the node E, and the message receiving process in a case where the message is received is described hereinafter. The node G is assumed to memorize the table shown in FIG. 6(C).

When the control unit 11 of the node G receives the participation message and the message receiving process in the above-mentioned basic process starts (Step S4), the control unit 11 starts this message receiving process (Start). In Step S11, when the control unit 11 of the node G judges that thus received message is the participation message (Step S11; YES), it acquires the region designation information indicative of level 3 included in the participation message (Step S14). The control unit 11 determines the level number in the table as level number 3 in response to the region designation information of the participation message (Step S15).

Next, the control unit 11 determines the column number (each level attention digit X) in the table as 0 (Step S16) and notices the area of level 3, attention digit X=0 in FIG. 6(C), which is indicative of the table of the node G. The control unit 11 judges whether or not thus determined column number is smaller than the column number of the entire table (Step S17). Since the determined column number 0 is smaller than the column number 3 of the entire table (Step S17; YES), the control unit 11 judges whether or not the node device corresponding to the attention [level number] [column number] is the own node device (Step S18).

Here, since the node device corresponding to the attention [level number 3] [column number 0] is not the own node device as shown in FIG. 6(C), the control unit 11 judges so (Step S18; NO), and then judges whether or not information of the other node device is memorized in the attention [level number] [column number] (Step S19).

Here, since the other node device is not memorized in [level number 3] [column number 0], the control unit 11 judges so (Step S19; NO), the control unit 11 skips this area, adds 1 to the value of the column number 0 to make the column number 1 (Step S22), and returns to Step S17.

Next, the control unit 11 goes through Step S17; YES, Step S18; NO, and Step S19; NO, and since the other node device is not memorized in [level number 3] [column number 1], the control unit 11 skips this area, adds 1 to the value of the column number 1 to make the column number 2 (Step S22), and returns to Step S17.

Next, the control unit 11 goes through Step S17; YES, judges that the area of [level number 2] [column number 2] is the own node device in Step S18 (Step S18; YES), adds 1 to the value of the column number 2 to make the column number 3 (Step S22), and returns to Step S17.

Next, the control unit 11 goes through Step S17; YES, Step S18; NO, Step S19; YES, Step S20, and Step S21; YES, sends the existence confirmation message to the node device (node H) having the node ID [1032] memorized in the [level number 2] [column number 3], adds 1 to the value of the column number 3 to make the column number 4 (Step S22), and returns to Step S17.

Here, the control unit 11 judges whether or not the determined column number is smaller than the column number of the entire table (Step S17), and since the determined column number 4 is not smaller than the column number 3 of the entire table (Step S17; NO), the control unit 11 recognizes the node device of the participation message transfer destination (sending destination) (Step S23). At this time, since the node device which is the closest to the node ID [1013] of the node Z being the participation request node is the own node device (node G) having the node ID [1023], the control unit 11 recognizes the node G as the participation message transfer destination.

Next, the control unit 11 judges whether or not the own node device is the node device which is the closest to the node ID [1013] of the node Z being the root node or the participation request node (Step S24). As mentioned above, since the own node device (node G) is the root node here, the control unit 11 judges so (Step S24; YES), and returns to the original process flow (Return).

Thus, the existence confirmation message sending process for creating the DHT routing table of the node Z being the participation request node and the participation message transfer process are finished.

(Node A)

Meanwhile, the message receiving process when the node A receives the existence confirmation message sent from the contact node B is described below.

When the control unit 11 of the node A receives the existence confirmation message and the message receiving process in the above-mentioned basic process starts (Step S4), the control unit 11 starts this message receiving process starts (Start). Here, it is premised that the existence confirmation message is received from the node B.

When the message receiving process starts, the control unit 11 judges whether or not thus received message is the participation message (Step S11). Here, since the received message is the existence confirmation message, the control unit 11 judges that the received message is not the participation message (Step S11; NO), and then judges whether or not the received message is the existence confirmation message (Step S12).

The control unit 11 judges that the received message is the existence confirmation message (Step S12; YES), acquires the IP address of the node Z being the participation request node which is added to the existence confirmation message, sends the response message to the node Z (Step S27), and returned to the original process flow (Return).

Besides, in a case where the message received by the node device 1 is not either of the participation message, the existence confirmation message, and the response message, the control unit 11 judges as Step S11; NO, Step S12; NO, and Step S13; NO, carries out the process in the case of receiving the other message (Step S30), and returns to the original process flow (Return).

(3) Process of Registering Other Node Device in Table in Node Device

The registration process of the other node device 1 in the node Z will be described with reference to FIG. 10 and the above FIG. 7. Here the registration process of the other node device 1 is explained under the assumption that the node Z receives a response message from the node A.

When the registration process of the other node device 1 in the above-mentioned basic process starts (Step S5), the control unit 11 of the node Z starts the table registration process of the node A (Start).

When the table registration process starts, the control unit 11 acquires information, specifically information such as IP address of the node A being the sending source node device, from the received response message (Step S31). Next, the control unit 11 recognizes the area to be registered in the table from thus acquired IP address, registers (Step S32), and returns to the original process flow (Return). Since the node A has the node ID [0211] as shown in FIG. 6(A), the area to be registered is level 1, each level attention digit X=0 in FIG. 7. The control unit 11 of the node Z registers the information of the node A in the area of the table level 1, each level attention digit X=0.

Meanwhile, subsequently the node Z receives the response message from one after another, the node E, the node C, the node G, the node D, the node F, and the node H. The control unit 11 registers information of each node device 1 in the table in response to the response messages from these node devices through the above-mentioned Steps S31 and S32, creates and memorizes the DHT routing table shown in FIG. 7. Further, the node Z may confirm that the other node device 1 exists and register information of the other node device 1 in the table when communication with the other node device 1 is established, as the participation message is sent to the above-mentioned node B.

[4. Modified Embodiment]

In the above-mentioned embodiments, the memory unit 12 of the node device 1 memorizes IP address and the node ID of the other node device 1 in correspondence with the DHT routing table. However, the configuration is not limited thereto. The node device 1 may memorize the node information indicative of a node device 1 being a candidate of the transfer destination of at least information.

However, the memory unit 12 as a memory means of the node device 1 preferably memorizes the node information and the identification information inherent to the node information, in correspondence with every region where the identification information belongs as the DHT routing table is. In such the case, the participation request node acquires the node information of the respective node devices belonging to respective regions of identification information appropriate to the identification information, by using the above-mentioned region designation information, and is able to memorize while maintaining a good balance. Further, it is preferable that the identification information region is divided into plural regions in conformity with rules of the identification information as the DHT routing table is, and the region the own node device belongs to is further divided into plural regions in conformity with rules of the identification information up to the stage where a region only own node device belongs to exists.

Here, the node information may include the port number or the like besides the IP address and is not especially limited. The identification information is not limited to the node ID but may be other identification information inherent to the node information.

In the above-mentioned embodiment, the control unit 11 of the node device 1 judges whether or not the node device 1 of transfer destination is memorized in a case where the control unit 11 of the node device 1 receives the participation message. In a case where it is memorized, the control unit 11 transfers the participation message to the node device 1 (Steps S23, S24; NO, S25). However, the configuration is not limited thereto. The control unit 11 as a participation request information transfer means of the node device 1 indicates a request of participation into the overlay network. In a case where the participation request information including the node information of the participation request node requesting for participation is received, the control unit 11 judges whether or not the node information indicating the node device of the transfer destination in response to the node information of the participation request node is memorized. In a case where the node information indicating the node device of the transfer destination is memorized, the participation request information may be transferred to the node device.

In the above-mentioned embodiment, the control unit 11 of the node device 1 sends the existence confirmation message to the node device 1 registered in one level of the table (Refer to black triangle marks in FIGS. 6(A) to 6(C)). However, the configuration is not limited thereto. The control unit 11 of the node device 1 as an existence confirmation information sending means judges whether or not the node information indicative of the node device other than transfer destination in response to the node information of the participation request node device is memorized. In a case where the node information indicative of the node device other than the transfer destination is memorized, the control unit 11 may send the existence confirmation message including the node information of the participation request node to the node device. More specifically, the control unit 11 may send the existence confirmation message to the node device 1 registered at plural levels. Or the control unit 11 may send the existence confirmation message to the arbitrarily selective node device 1 registered. Further, when the control unit 11 sends the existence confirmation message to the node device 1 other than the above-mentioned transfer destination, the control unit 11 may send the existence confirmation message to the node device 1 of the transfer destination in response to the node information of the participation request node device 1.

In the above-mentioned embodiment, the control unit 11 of the node device 1 sends region designation information being level number information in the DHT routing table (Steps S1 and S25), when initially sending the participation message or transferring the participation message. However, the configuration is not limited thereto. The control unit 11 of the node device 1 as a participation request information transfer means may add region designation information designating the prescribed region in the memory means, to the participation request information, when transferring the participation request information. The region designation information is not limited to the level number information. In a case where the region designation information is used, the control unit 11 as an existence confirmation information sending means sends the existence confirmation information in response to contents of region designation information or whether or not the region designation information is added to the received participation request information (Steps S14 and S15), in a case where node information of the other node device being sending destination is memorized.

Further, as in the above-mentioned embodiment, it is preferable that the control unit 11 as an existence confirmation information sending means sends the existence confirmation information to the other node device belonging to the region corresponding to the region designation information of the memorized identification information, in a case where the region designation information is added to the received participation request information (Steps S14, S15, and S20). Here, it is preferable that the control unit 11 as an existence confirmation information sending means sends the existence confirmation information to the other node device belonging to the largest region (level 1 in the above-mentioned embodiment) of the memorized identification information (Step S20), in a case where the participation node does not use the region designation information or the received participation request information is not added to the region designation information. Here, the control unit 11 as participation request information transfer means adds the region designation information designating the region in response to the smaller scope than the identification information corresponding to the region designation information, to the participation request information (Steps S14, S15, and S25), in a case where the region designation information is added to the received participation request information. Further, the control unit 11 as participation request information transfer means adds the region designation information designating the next step region (level 2 in the above-mentioned embodiment) of the largest region (level 1 in the above-mentioned embodiment) of the identification information, to the participation request information (Step S25), in a case where the region designation information is not added to the received participation request information.

The information communication system or the like according to the present invention can carry out a participation request information transfer process, an existence confirmation information sending process, and a return information sending process without using the above-mentioned region designation information.

Figure 9:
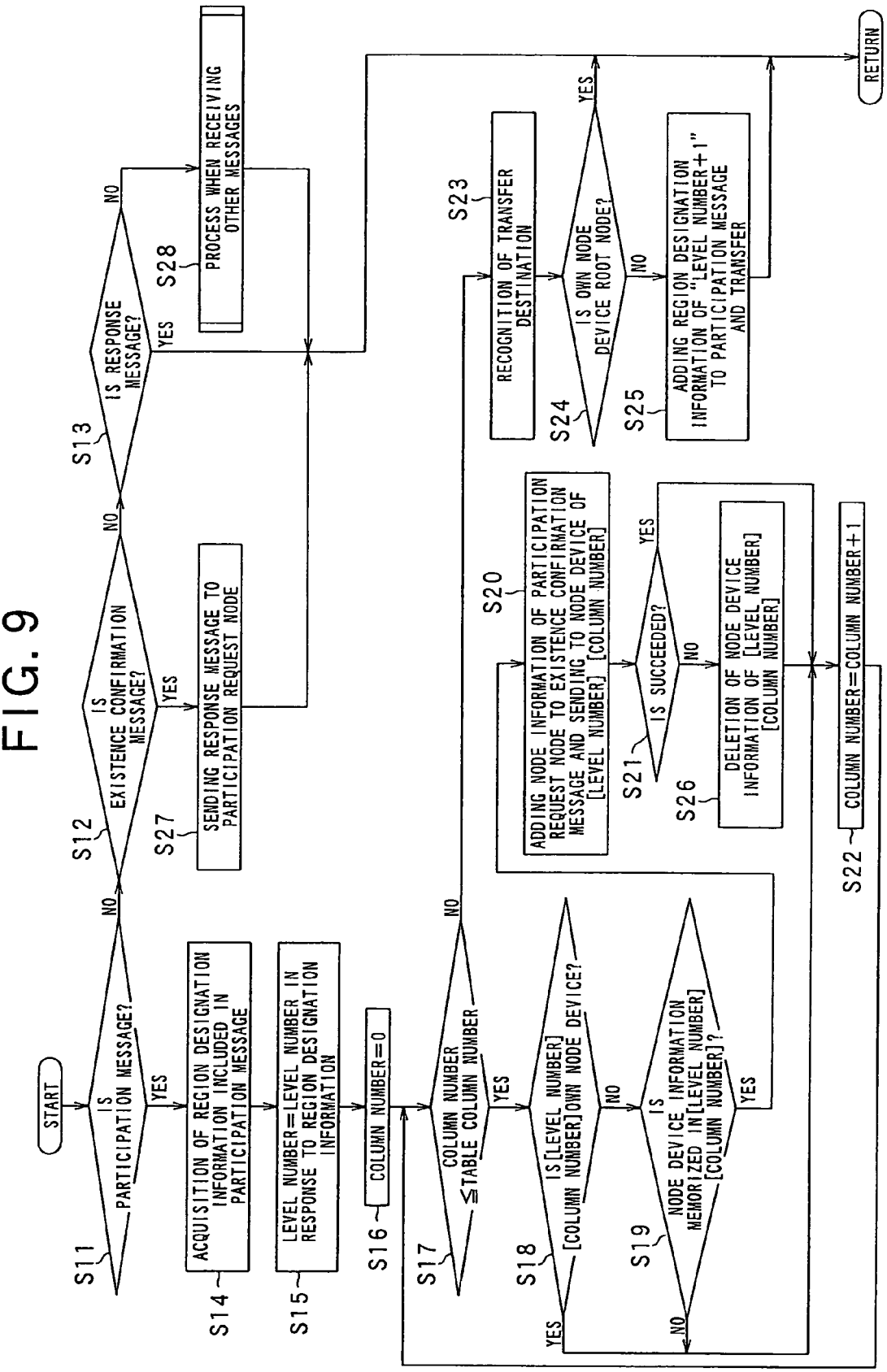
FIG. 9 is a flowchart showing a process of receiving a message in a node device 1.

In the above-mentioned embodiment, operations of the respective node devices and the entire system in a case where the node device 1 participates in the information communication system S are not limited to the explanation with reference to FIGS. 8 to 10. The node device 1 causing the participation request information transfer means to function by the operations of Steps S23, S24, and S25 may further send the node information of the node device 1 being the sending destination of the existence confirmation message, to the participation request node. This operation is carried out by the control unit 11 as a node information sending means. Here, it is possible for the participation request node to acquire node information of the other node device from two units of node devices, thereby enabling to memorize more accurate DHT routing table.

In the above-mentioned embodiment, the node A or the like receiving the existence confirmation message sends the response message to the participation request node (node Z). However, the configuration is not limited thereto. The control unit 11 of the node device 1 as a return information sending means may send the return information to the participation request node in a case where at least existence confirmation information is received. For example, the control unit 11 of the node device 1 as a return information sending means may further send the return information to the participation request node in a case where the participation request information is received.

Further, a program corresponding to each operation of the above-mentioned node device 1 may be recorded in the information recording medium such as flexible disk or hard disk, or acquired and recorded through a network such as internet, and read out by a microcomputer or the like for execution, so that the microcomputer can function as the control unit 11 related to the respective embodiments.

What is claimed is:

1. An information communication system comprising an overlay network formed by participation of a plurality of node devices, mutually connected through a communication route, at least one of the plurality of node devices comprising:

a memory unit for memorizing node information indicative of a first node device to be a candidate of an information transfer destination;

a participation request information transfer unit for judging whether or not the information transfer destination is memorized in the memory unit, based on the node information indicative of a participation request node device, in response to receiving participation request information which indicates a participation request into the overlay network and includes the node information of the participation request node device requesting participation, and transferring the participation request information to the information transfer destination in response to judging that the information transfer destination is memorized in the memory unit;

an existence confirmation information sending unit for judging whether or not node information indicative of a second node device, the second node device being a node device other than the information transfer destination, is memorized in the memory unit, in response to receiving the participation request information, and sending the existence confirmation information including the node information of the participation request node device to the second node device in response to judging that the node information indicative of the second node device is memorized; and a return information sending unit for sending return information to the participation request node device in response to receiving the existence confirmation information.

2. A communication method in an information communication system comprising an overlay network that is formed by participation of a plurality of node devices mutually connected through a communication network, at least one of the plurality of node devices comprising a memory unit for memorizing node information indicative of a first node device to be a candidate of an information transfer destination, the communication method comprising:

judging whether or not the information transfer destination is memorized in the memory unit, based on the node information indicative of a participation request node device, in response to receiving participation request information which indicates a participation request into the overlay network and includes the node information of the participation request node device requesting participation;

transferring the participation request information to the information transfer destination in response to judging that the information transfer destination is memorized in the memory unit;

judging whether or not node information indicative of a second node device, the second node device being a node device other than the information transfer destination, is memorized in the memory unit, in response to receiving the participation request information;

sending the existence confirmation information including the node information of the participation request node device to the second node device in response to judging that the node information indicative of the second node device is memorized; and sending return information to the participation request node device in response to receiving the existence confirmation information.

3. One node device included in an information communication system comprising an overlay network that is formed by participation of a plurality of node devices mutually connected through a communication route comprising:

a memory unit for memorizing node information indicative of a first node device to be a candidate of information transfer destination;

a participation request information transfer unit for judging whether or not the information transfer destination is memorized in the memory unit, based on the node information indicative of a participation request node device, in response to receiving participation request information which indicates a participation request into the overlay network and includes the node information of the participation request node device requesting participation, and transferring the participation request information to the information transfer destination in response to judging that the information transfer destination is memorized in the memory unit;

an existence confirmation information sending unit for judging whether or not node information indicative of a second node device, the second node device being a node device other than the information transfer destination, is memorized in the memory unit, in response to receiving participation request information and sending the existence confirmation information including the node information of the participation request node device to the second node device in response to judging that the node information indicative of the second node device is memorized; and a return information sending unit for sending return information to the participation request node device in response to receiving the existence confirmation information.

4. The node device receiving the return information from the node device according to claim 3, wherein:

the memory unit memorizes the node information corresponding to a node device of the sending source of the return information thus received.

5. The node device according to claim 3, wherein the memory unit memorizes the node information and an inherent identification information corresponding to the node information in correspondence with each region of a plurality of regions of the identification information, the participation request information transfer unit adds region designation information designating a predetermined region in the memory unit to the participation request information in response to transferring the participation request information, and the existence confirmation information sending unit sends the existence confirmation information to the node device, in response to memorizing node information of another node device to be a sending destination of the existence confirmation information, based on whether or not the region designation information is added to the participation request information thus received and content of the region designation information.

6. The node device according to claim 5, wherein one region of the plurality of regions of the identification information is divided into a plurality of regions according to a rule of the identification information and the region to which an own node device belongs is further divided into a plurality of regions according to the rule of the identification information up to a stage where the region to which the own node device belongs exists, the existence confirmation information sending unit sends the existence confirmation information to the other node device belonging to a region corresponding to a region designation information of the memorized identification information in response to adding the region designation information to the received participation request information, and the participation request information transfer unit adds the region designation information designating a region corresponding a smaller scope than that of the region of the identification information, corresponding to the region designation information, to the participation request information, in response to adding the region designation information to the participation request information thus received.

7. The node device according to claim 6, further comprising:

a node information sending unit for sending the node information of the node device, the node device being a sending destination of the existence confirmation information to the participation request node device in response to sending the existence confirmation information by the existence confirmation information sending unit.

8. The node device according to claim 5, further comprising:

a node information sending unit for sending the node information of the node device, the node device being a sending destination of the existence confirmation information to the participation request node device in response to sending the existence confirmation information by the existence confirmation information sending unit.

9. The node device according to claim 3, further comprising:

a node information sending unit for sending the node information of the node device, the node device being a sending destination of the existence confirmation information to the participation request node device in response to sending the existence confirmation information by the existence confirmation information sending unit.

10. A non-transitory computer-readable medium recording a program to be performed by a node device included in an information communication system comprising an overlay network that is formed by participation of a plurality of node devices, mutually connected through a communication network, at least one of the plurality of node devices comprising a memory unit for memorizing node information indicative of a first node device to be a candidate of an information transfer destination, the program comprising:

judging whether or not the information transfer destination is memorized in the memory unit, based on the node information indicative of a participation request node device, in response to receiving participation request information which indicates a participation request into the overlay network and includes the node information of the participation request node device requesting participation;

transferring the participation request information to the information transfer destination in response to judging that the information transfer destination is memorized in the memory unit;

judging whether or not node information indicative of a second node device, the second node device being a node device other than the information transfer destination, is memorized in the memory unit, in response to receiving the participation request information;

sending the existence confirmation information including the node information of the participation request node device to the second node device in response to judging that the node information indicative of the second node device is memorized; and sending return information to the participation request node device in response to receiving the existence confirmation information.

* * * * *